Dec. 29, 1959  J. C. WHITING  2,918,941
PRESSURE RELIEF BLOW-OUT DEVICE
Filed Dec. 2, 1957
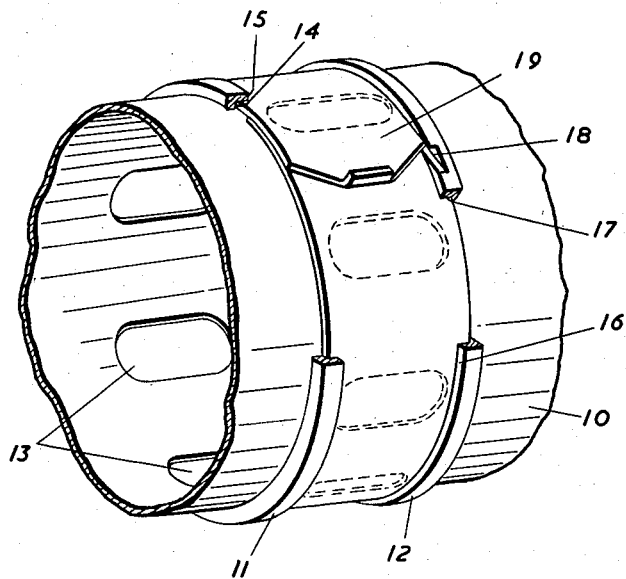
INVENTOR
J. C. WHITING
BY: Maybee & Legris
ATTORNEYS

United States Patent Office 2,918,941
Patented Dec. 29, 1959

2,918,941

PRESSURE RELIEF BLOW-OUT DEVICE

James Clifford Whiting, Downsview, Ontario, Canada, assignor to Orenda Engines Limited, Malton, Ontario, Canada, a corporation Application December 2, 1957, Serial No. 700,201

1 Claim. (Cl. 138—92)

This invention relates to pressure relief devices and in particular to a pressure relief device for a pipe carrying a gas under pressure.

Duct and conduit systems which are used to carry gases under pressure are, as is well known, frequently provided with pressure regulating valves and with pressure relief valves of the automatic, self closing type which will permit a bleed of gas from within the duct or pipe to take place when the pressure within the pipe exceeds a certain predetermined value and which, when the pressure has dropped to within the prescribed limits, will close once more to preserve that acceptable level of pressure within the system.

The construction of modern aircraft and the complexity of the control systems and other mechanisms which are associated therewith has made it necessary to provide extremely elaborate conduit systems for carrying compressed air from one portion of the aircraft to another for various purposes. Such pressurized conduit systems are, of course, commonly provided with the pressure relief and pressure regulating valves of the type referred to above.

It will readily be appreciated that a pressurized conduit system of the type outlined above is a rather expensive system to construct and the replacement of parts is a service problem of considerable magnitude. As a result, it is considered to be desirable to provide additional safeguard means in the system which will be operative to relieve excessive pressure within the system in the event that the pressure relief valves or bleed valves should fail to perform their function satisfactorily. Conditions may arise in a pressurized system of this type such that the damage to the aircraft which might result from extreme high pressure in the conduit which could not be relieved by reason of the failure of pressure relief valves would be greater than the damage or inconvenience which might result from the failure of the system as a whole due to a sudden complete pressure drop in the system. For example, if compressed air were used to actuate the control surfaces of an aircraft wing, failure of the pneumatic system due to a complete pressure drop might be tolerated in the event that manual controls were provided to take over when the power controls failed. If, on the other hand, no means were provided for the relief of excessive pressure in the event that the normal relief valve failed to function, the bursting of an air conduit might result which could, in turn, result in damage which would bring about the destruction of the aircraft.

It is appreciated, of course, that pressurized air is seldom used for a purpose such as has been outlined above but it is believed that the example used will serve to point out the general application of a pressure relief device of the type contemplated by the present invention.

According to the present invention a pressure relief device comprises a pipe having at least one hole in the wall of the pipe and a strip of sheet material surrounding the pipe over the hole with its ends in overlapping relationship and means in engagement with the edges of the strip to hold them against displacement in a direction outwardly of the surface of the pipe.

A preferred embodiment of the invention will be described in the following specification with particular reference to the accompanying drawing in which:

Figure 1 is a perspective view, partly broken away.

Referring to Figure 1 a pipe 10 may be seen which, in the embodiment illustrated, is provided with a pair of integral, radially outwardly extending collars 11 and 12 which are separated from each other axially of the pipe 10.

A series of holes 13 placed in a circumferential row about the pipe 10 are provided between the collars 11 and 12, the combined area of the holes 13 being capable of bleeding off sufficient air from within the pipe 10 to maintain the pressure within the pipe at a safe level.

Each collar 12 is provided with a first annular groove, concentric with the pipe, in that face of the collar adjacent the other collar. In other words, collar 11 is provided with a first annular groove 14 in face 15 of collar 11 which face 15 is adjacent face 16 of collar 12 in which face is also provided a first annular groove 17.

In addition to grooves 14 and 17 in faces 15 and 16 of collars 11 and 12, a second groove 18 in each collar is provided leading to, in the case of collar 12, groove 17 from the periphery of the collar 12 and lying along a tangent to the groove 17. A similar second groove is provided in collar 11, the two tangential grooves (only one of which is seen in the drawing) lying in a single plane which is parallel to the longitudinal axis of the pipe 10.

A strip of sheet material 19 of a width equal to the separation between the bottoms of the grooves 14 and 17 and the two tangential grooves and of a length greater than the perimeter or circumference of the annular grooves 14 and 17 is provided as may be seen in Figure 1. The strip 19 may be placed in position by inserting one end in the tangential grooves and sliding the strip into the grooves until it enters the annular grooves 14 and 17. By continuing to slide the strip into the grooves the end of the strip which first entered the tangential grooves will pass completely around the annular grooves and will ultimately commence its second convolution about the pipe, this first end thereby lying in overlapping relationship with the other end of the strip.

The fit between the edges of the strip 19 and the bottoms of the grooves 14 and 17 is sufficiently loose to enable the strip to be slid into the grooves but sufficiently tight to prevent an appreciable loss of pressure or air from within the pipe 10 when the strip 19 is in its sealing position with respect to the holes 13. The overlapping of the ends of the strip when in the final position will result in the strips forming a complete cylinder about the area of the pipe containing the holes 13 and will effectively prevent the loss of any appreciable amount of pressurized gas from within the pipe.

In the event that the pressure within the pipe should rise above the maximum safe level, the internal pressure on the strip will cause it to buckle and curve in a direction normal to the direction of curvature which it has assumed as a result of being wrapped around the pipe. This will cause the edges of the strip to move towards each other due to distortion of the strip and, ultimately, the strip will be sprung out of engagement with the grooves 14 and 17 thereby permitting the holes 13 to spill the contents of the pipe 10 and thereby reduce the pressure to a safe level. The advantages of the pressure relief system constructed in accordance with the present invention are several and of considerable importance. Firstly, it enables a pressure relief device to be embodied in a conduit of the type described with virtually no localized increase in size of the conduit. The maximum outside diameter of the pipe at the position of the pressure relief device is very slightly larger than that over the balance of the pipe lengh and can be positioned in a place where this minor increase in diameter can be readily accommodated.

In addition, the increase in weight of the pipe embodying the pressure relief device is not material over a pipe without such a device and results in a considerable saving in weight over the conventional spring loaded pressure relief valve. A further advantage resides in the fact that the curvature of the strip 19 which results from its being wrapped around the pipe 10 greatly increases its resistance to bending in a direction normal to the direction of primary curvature and, as a result, a strip of sheet metal or other material may be used which is considerably thinner and lighter than might otherwise be the case. The primary curvature of the strip imparts considerable rigidity to the entire assembly which enables a relatively light assembly to be used even when high pressures are contemplated.

The pressure relief device of the present invention has been described in particular detail with reference to a specific construction but it is to be understood that this is illustrative only of one form of construction which may embody the inventive concept. The scope of the invention and the limit of monopoly which it is desired to secure is defined in the appended claim.

What I claim as my invention is:

A pressure relief device for a cylindrical pipe comprising a pair of collars extending radially outwardly of the external surface of the pipe and spaced axially of one another, a series of holes in the pipe between the two collars, a first annular groove concentric with the pipe in that face of each collar adjacent the other collar, a second groove in each collar leading to the annular groove and lying along a tangent to the annular groove, and a strip of sheet material of a width equal to the separation between the bottoms of the two grooves in one collar and the bottoms of the two grooves in the other collar and of a length greater than the circumference of the grooves, surrounding the pipe between the collars with its edges seated in the grooves and its ends in overlapping relationship to seal the holes in the pipe.

References Cited in the file of this patent

UNITED STATES PATENTS

| 141,536 | Bellemere et al. | Aug. 5, 1873 |
| 2,307,043 | Hothersall | Jan. 5, 1943 |
| 2,673,660 | Nordin | Mar. 30, 1954 |

FOREIGN PATENTS

| 112,701 | Australia | Mar. 20, 1941 |